J. E. SCHNEIDER.
IRRIGATING CONDUIT.
APPLICATION FILED DEC. 2, 1912.
1,112,724.
Patented Oct. 6, 1914.
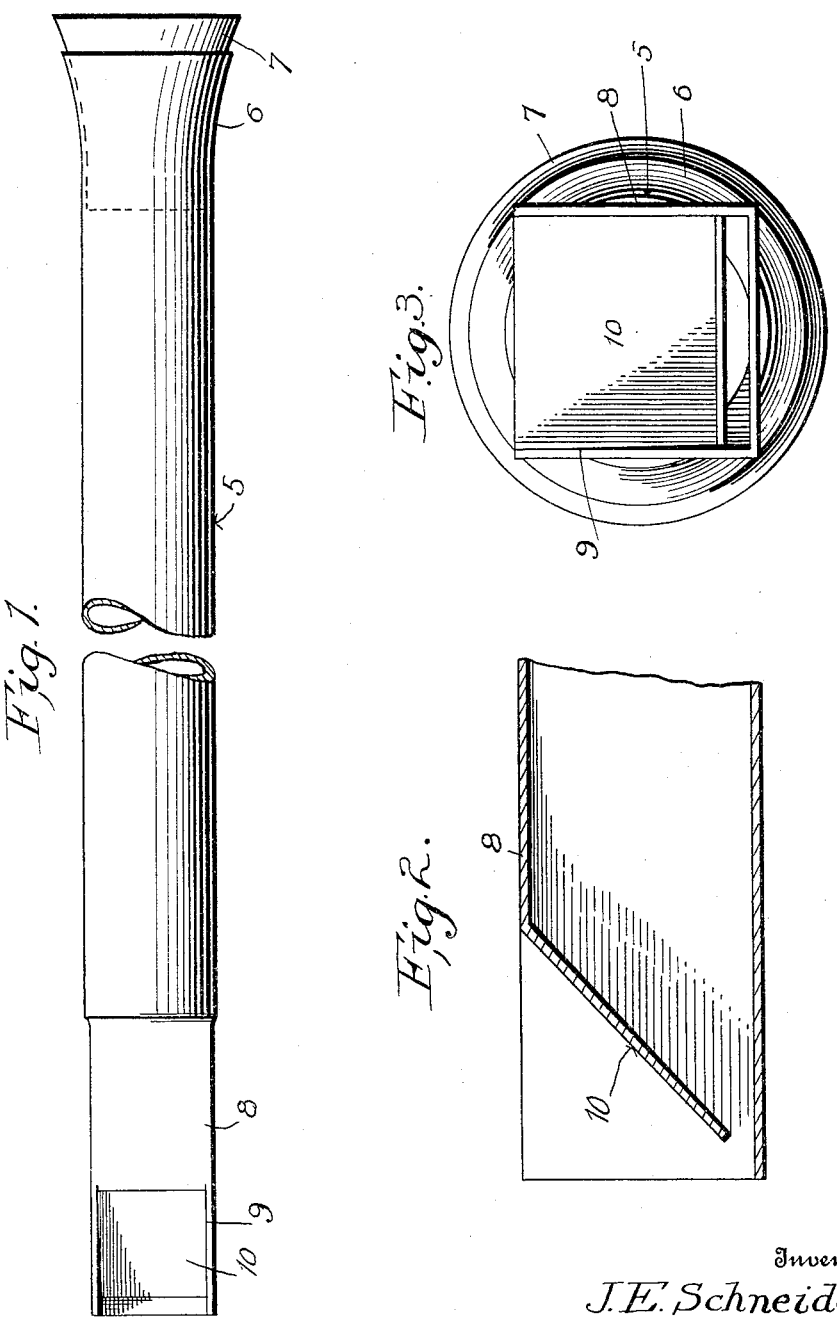
Inventor
J. E. Schneider

UNITED STATES PATENT OFFICE.

JOHN E. SCHNEIDER, OF CORTEZ, COLORADO.

IRRIGATING-CONDUIT.

1,112,724. Specification of Letters Patent. Patented Oct. 6, 1914.

Application filed December 2, 1912. Serial No. 734,598.

*To all whom it may concern:*

Be it known that I, JOHN E. SCHNEIDER, a citizen of the United States, residing at Cortez, in the county of Montezuma and State of Colorado, have invented certain new and useful Improvements in Irrigating-Conduits, of which the following is a specification, reference being had to the accompanying drawings.

This invention relates to an improved irrigating conduit or tube and has for its primary object to provide a device of this character whereby water may be distributed from the main irrigating ditch to each row of plants, thereby eliminating the necessity of digging troughs to conduct the water to the plant rows and thus effecting a saving of water and time and labor in the installation of the irrigating system.

Another object of the invention resides in the provision of an irrigating conduit constructed preferably of galvanized sheet metal and improved means forming an integral part of the conduit for regulating the flow of water from the outlet of the conduit and thus preventing flooding of the field.

Still another object of the invention is to provide a device for the above purpose which is extremely simple in construction, may be manufactured at very small cost and is highly efficient in practical use.

With the above and other objects in view, the invention consists in the novel features of construction and the combination and arrangement of parts to be hereinafter more fully described, pointed out in the claims and shown in the accompanying drawings, in which—

Figure 1 is a plan view of an irrigating conduit illustrating the preferred embodiment of the invention. Fig. 2 is a longitudinal section thereof and Fig. 3 is an end view.

Referring in detail to the drawing, 5 designates the cylindrical body portion of the tube or conduit which is constructed from galvanized iron or other material and the length of which will vary in accordance with the width of the ditch bank through which the conduit is to extend. One end of the cylindrical body portion of the conduit is flared or diametrically enlarged as indicated at 6 and communicates with the main irrigating ditch. This enlarged end of the conduit is adapted to be closed when desired by means of a suitable plug indicated at 7 to cut off the flow of water into the distributing conduit. The other or outlet end of the conduit 5 is of rectangular form in cross section as indicated at 8. The cross sectional area of this outlet end of the conduit may vary, as desired, in accordance with the surface area of the field to be irrigated. It is to be further understood that in putting the invention into practice, I do not desire to limit myself to the specific form of this outlet end of the conduit as illustrated in the drawing, as the essential feature of the invention, which will now be described, is applicable to a great many variations of this illustrated form of the conduit.

In the present instance, it will be noted from reference to Fig. 1 that the upper wall of the rectangular end portion 8 of the conduit is separated at its longitudinal edges from the side walls for a short distance from the open end of said conduit as indicated at 9. This separated portion of the upper wall provides a spring plate 10, said plate, of course, remaining connected to or integral with the upper wall of the conduit at the inner end of said plate. This plate 10 is pressed or forced in any suitable manner inwardly between the opposed side walls of the tube or conduit so as to dispose the free end of said plate in contiguous relation to the bottom wall of the conduit as clearly shown in Fig. 3. It will be apparent that the plate 10 acts in the nature of a yieldable gate which regulates the outflow of water from said conduit in accordance with the pressure in the main irrigating ditch, said plate acting to retard the discharge of the water upon abnormal or flood pressure in the main ditch and thus obviating flooding of the field which would otherwise occur. Under normal conditions, this spring plate maintains a relatively stationary position and thus insures the distribution of the water in constant uniform volume to the plant row. Foreign substances which may be carried into the conduit by the water will, however, be able to pass freely through the outlet thereof, the pressure overcoming the tension of the spring plate 10.

From the foregoing, it is thought that the construction and several advantages of my improved irrigating tube will be clearly apparent. It will be readily seen that by the use of a distributing tube or conduit constructed as above set forth, much time and labor is saved by eliminating the necessity of digging lateral troughs from the main irrigating ditch to the plant rows, and an equal distribution of the water supply over the entire field is assured. Owing to the extremely simple form of the device, it will be obvious that the same may be manufactured at comparatively small cost.

While I have above described the preferred construction of my improved irrigating conduit, it will be obvious that the invention is not limited to such specific structural features but is susceptible of considerable modification as may be deemed desirable in order to adapt the device to special circumstances without departing from the essential feature or sacrificing any of the advantages thereof.

What I claim is:—

1. An irrigating conduit constructed of sheet metal the wall of said conduit being longitudinally split at its outlet end to provide a free resiliently movable check gate extending into the conduit and acting to maintain a uniform flow of water from the outlet thereof under normal conditions.

2. An irrigating conduit constructed of sheet metal, the outlet end of said conduit being of rectangular form in cross section, one of said walls at its outlet end having a free resiliently movable portion extending into the conduit between the side walls thereof, and normally occupying a stationary position in contiguous relation to the opposed wall of the conduit to maintain a uniform flow of water from the outlet of the conduit under normal conditions.

In testimony whereof I hereunto affix my signature in the presence of two witnesses.

JOHN E. SCHNEIDER.

Witnesses:
 WILLIAM H. FRITZ,
 KATIE MORRISON.

---

Copies of this patent may be obtained for five cents each, by addressing the "Commissioner of Patents, Washington, D. C."